United States Patent
Palumbo

(10) Patent No.: US 6,368,078 B1
(45) Date of Patent: Apr. 9, 2002

(54) BLADELESS TURBOCHARGER

(76) Inventor: John F. Palumbo, 241 Oak Knoll Rd., Barrington, IL (US) 60010

( * ) Notice: Subject to any disclaimer, the term of this patent is extended or adjusted under 35 U.S.C. 154(b) by 0 days.

(21) Appl. No.: 09/723,022

(22) Filed: Nov. 27, 2000

(51) Int. Cl.$^7$ .............................................. F04B 19/00
(52) U.S. Cl. .................... 417/407; 415/90; 415/202; 415/206; 415/212.2; 416/223 R
(58) Field of Search ................... 417/407, 183, 417/159; 415/90, 202, 205, 206, 212.1; 416/223 R

(56) References Cited

U.S. PATENT DOCUMENTS

| | | | |
|---|---|---|---|
| 3,975,911 A | 8/1976 | Morgulis | |
| 4,025,225 A | 5/1977 | Durant | 415/90 |
| 4,036,584 A | 7/1977 | Glass | 415/90 |
| 4,124,979 A | 11/1978 | Tholen | |
| 4,218,176 A | 8/1980 | Gawne | 415/90 |
| 4,218,177 A * | 8/1980 | Robel | 415/90 |
| 4,280,791 A * | 7/1981 | Gawne | 415/90 |
| 4,355,850 A | 10/1982 | Okano | 417/407 |
| 4,367,626 A | 1/1983 | Schwartzman | |
| 4,403,911 A | 9/1983 | Possell | 415/90 |
| 4,416,582 A | 11/1983 | Glass | 415/90 |
| 4,512,716 A * | 4/1985 | Marr et al. | 415/205 |
| 4,586,871 A * | 5/1986 | Glass | 415/90 |
| 5,192,183 A | 3/1993 | Wilkinson | 415/90 |
| 5,388,958 A | 2/1995 | Dinh | 415/90 |
| 5,406,796 A | 4/1995 | Hiereth | |
| 5,834,877 A * | 8/1999 | Harmann | 416/223 R |

FOREIGN PATENT DOCUMENTS

| | | | | |
|---|---|---|---|---|
| JP | 401190996 A | * | 8/1989 | 415/212.1 |
| JP | 405202886 A | * | 8/1993 | 415/206 |

* cited by examiner

Primary Examiner—Thomas Denion
Assistant Examiner—Thai Ba Trieu
(74) Attorney, Agent, or Firm—Meroni & Meroni, P.C.; Charles F. Meroni, Jr.

(57) ABSTRACT

A bladeless turbocharger is disclosed for use with an internal combustion engine. The apparatus includes a drive shaft engaged with a bearing assembly that has a turbine driven by the exhaust gas from the internal combustion engine at one end and a blower driven by the turbine at the other. The turbine and blower have flat disks spaced at a critical distance apart with open circular centers that have spokes mounting them to the drive shaft. The critical distance between the turbine disks promotes the boundary layer drag effect of the exhaust gas against the turbine disks. The blower transfers rotational energy to air entering the critical distance between the blower disks by boundary layer drag effect of the air against the blower disks only. The energy transfer increases the mass per unit volume of the air that exits the blower through a blower outlet.

15 Claims, 10 Drawing Sheets

BLADELESS TURBOCHARGER

BACKGROUND OF THE INVENTION

1. Field of the Invention

The claimed invention relates generally to turbochargers designed to increase internal combustion engine performance.

2. Description of the Prior Art

Turbochargers have typically used a turbine driven by exhaust gas from an internal combustion engine to drive a compressor for compressing air that is injected into the engine intake of the internal combustion engine in order to increase power output and efficiency.

There are several factors leading to engine power and efficiency. One key factor to creating power is the amount of fuel that can be burned which is directly related to the amount of air that can be used in the engine. The second is engine compression ratio; greater compression ratio results in greater power and efficiency. Compression ratio is limited due to knock in spark ignited engines, which will damage an engine and reduce power. Of importance to this invention, two of the many variables resulting in knock are the amount of air mass in the combustion chamber and the temperature of the air. Low air mass and low temperatures result in lower chance of engine knock. Therefore, highest engine power is achieved by high mass airflow of cool air and the highest possible compression ratio. This increase in power output and efficiency is accomplished by increasing the mass flow rate of air injected in the engine intake of the internal combustion engine. However, compression of the air that is injected into the engine intake results in making the flow of the air turbulent and increases the temperature of the air to be injected. This creation of turbulence and increased temperature are undesirable by products of providing a high mass flow rate of air to the engine intake. In order to counter these effects, the prior art typically employs a diffuser to reduce air turbulence and intercoolers to control air temperatures.

In diesel engines, the upper temperature limit of intake air charge is dictated by emissions, as higher temperature air mass negatively impacts an engine's emission output.

The turbine, which typically consists of a housing and a bladed rotary wheel vane attached to a shaft, drives the compressor. The bladed rotary wheel vane usually employs complicated vane geometry to transfer the linear energy of the exhaust gases entering the turbine into rotational energy that drives the compressor. These types of turbines are often expensive to manufacture and are relatively inefficient. The size of the turbine is typically governed by the power characteristics of the internal combustion engine on which it will be used.

The compressor typically consists of a housing and a bladed impeller. Air is inlet into the compressor and compressed between the impeller blades and the housing which increases the mass of air within a given volume. This compressed air is then injected into the engine intake. The size of the compressor is typically governed by the power characteristics of the internal combustion engine on which it will be used.

The air intake requirements of the internal combustion engine varies during engine operation due to fluctuating demand. This requires the turbocharger to be capable of varying the pressure and volume of air input relative to engine requirements. Current technology utilizes bypass mechanisms that vent engine exhaust gases around the turbine in order to diminish the velocity of the system which reduces the output of the compressor.

There are several turbochargers disclosed in the prior art that operate as here described. Some examples are U.S. Pat. Nos. 5,406,796, 4,367,626, 4,124,979, and 3,975,911. U.S. Pat. No. 5,406,796, issued to Hiereth, comprises a compressor driven by a turbine that is on the same shaft which is driven by exhaust gas from an internal combustion engine. U.S. Pat. No. 3,975,911, issued to Borisovich, is comprised of a compressor driven by a turbine that is on the same shaft which is driven by exhaust gas from an internal combustion engine. In addition, Borisovich also discloses the use of a diffuser to reduce turbulence in the air that is being injected. U.S. Pat. No. 4,124,979, issued to Tholen, discloses a turbocharger that uses an intercooler to control the temperature of the air that is being injected into the internal combustion engine.

Turbochargers use energy from four or two stroke engines exhaust to pump intake air into said engine. High pressure exhaust gases rotate the driver of the turbine which in turn rotates the compressor of the system that is on the same shaft. The compressor then pumps air into the intake portion of the engine. Current turbocharger compressors and drivers utilize complicated vane geometry to impart air movement. These are relatively inefficient which results in insufficient use of exhaust gases and heating of output air from the turbocharger. The geometry of these components is difficult and expensive to manufacture. Accordingly, it would be desirable to have a turbocharger that makes more efficient use out of the energy provided by the exhaust gases without increasing the turbulence and temperature that is associated with increasing the mass flow rate of air entering the internal combustion engine.

SUMMARY OF THE INVENTION

Accordingly, it is the object of the claimed invention to provide a turbocharger that can efficiently increase the power output of the internal combustion engine by increasing the mass flow rate of air that enters a engine intake of the internal combustion engine with a reduced amount of turbulence and temperature change imparted upon the air entering the engine intake.

Another object of the claimed invention is to provide a turbocharger that reduces exhaust manifold back pressure.

Still another object of the claimed invention is to reduce the manufacturing costs associated with the production of a highly efficient turbocharger.

To achieve the foregoing and other objectives, and in accordance with the purposes my invention, a bladeless turbocharger comprising both a blower and a turbine of similar designs known herein as a bladeless blower and a bladeless turbine is provided. The bladeless turbocharger utilizes engine exhaust gases from an internal combustion engine entering the bladeless turbine to drive the bladeless blower that produces a charge air to an internal combustion engine for the purpose of increasing engine power. Both the bladeless blower and the bladeless turbine are comprised of flat rigid spaced disks contained in an annular shaped volute that utilizes laminar viscous boundary layer drag to achieve more efficient results.

It is well known that fluids have a resistance to flow adjacent to a stationary surface known as the boundary layer effect. This boundary layer is the region of fluid adjacent to the surface in which viscous forces promote laminar fluid flow. The boundary layer thickness is defined as the distance from the surface to a point within the fluid stream where the velocity of the fluid is within one percent of the free stream velocity. The mass flow rate of fluid within the boundary layer is higher than that within the free stream due to the higher efficiency of laminar flow. Accordingly, the mass flow rate of fluid adjacent to a solid moving surface is greater than the mass flow rate of fluid that would pass through the same region in the absence of the boundary layer effect. My invention utilizes the laminar flow of fluid present within the boundary layer effect to accomplish the aforementioned intention of a system producing a cool air charge for an internal combustion engine powered by the engine's exhaust gases.

Current turbocharger technology normally requires the use of a diffuser to diminish the turbulence imparted to the air charge before it is introduced into the intake portion of the engine. Highly turbulent air negatively impacts efficient air flow. In my invention, the viscosity of air acting against the moving blower disks produces circular air flow between blower disks. The resulting annular air speed and centrifugal forces create pressure and air flow. The non turbulent nature of air flow between the blower disks results in increasing the effective mass of air delivered for combustion while not appreciably increasing the ambient air temperature.

The exhaust gases exiting the internal combustion engine enter the system at an impinging angle to a collection of contained disks on the turbine side of the system through specially designed ports. This reduces engine exhaust manifold back pressure due to the engine exhaust entering the bladeless turbine not being restricted by a rotary wheel vane. This method is of higher efficiency and therefore produces less back pressure to achieve the same turbocharger shaft power. This causes the collection of disks to rotate at a high velocity consistent with the speed of the exhaust gases. The engine exhaust gases, by reason of their resistance to flow over a body of different speed, upon entering through the inlets and coming in contact with the disks, are subject to viscous laminar flow acting tangentially in the direction of rotation. Exhaust gas pressure forces exhaust air towards the center of the disk. The disks will be set in motion rotationally with the engine exhaust gases moving in a spiral path at a continuously diminishing velocity until they reach the center of the disk where they are discharged.

This rotation in turn causes the disk of the blower side of the system to rotate at the same rotational velocity since the disks are affixed to the same shaft. The same principles apply with regard to the factor of viscous laminar flow. Ambient temperature inlet air is accelerated to a velocity consistent with the perimeter velocity of the rotating disks into the outlet passage of the device and subsequently into the intake portion of the internal combustion engine. The combined effect of these tangential and centrifugal forces is to propel the inlet air with an increasing velocity in a spiral path until it reaches a suitable peripheral outlet from which it is ejected. If the disks are allowed to turn freely owing to an adequate bearing system, the rim of the disk will attain a speed closely approximating that of the exhaust gases and the spiral path of the gases will be comparatively long and consist of almost circular annular turns.

Since this spiral movement of air is free and undisturbed and essentially dependent on the properties of the air permitting it to its natural stream lines and to change its velocity and direction by minimal increments of degrees it does not cause turbulence in the air. Since the air is compressed in a manner utilizing laminar flow there is an increase in air density delivered to the intake portion of the internal combustion engine over current technology. This feature is essential to the successful operation of this invention. Of course, air is heated when compressed as per the ideal gas law. It is the heating due to inefficiencies that is minimized.

Each engine application will require a reconfiguration of the diameter and/or the number of disks in the assemblies to accommodate the flow of air required for each specific engine size. Currently, there are specific engine mapping processes that describe optimum engine requirements (air charge volume and pressure) at specific engine performance characteristics. These requirements will vary according to each engine size and are available in publications available in the public domain. My invention has demonstrated that the configuration utilized reveals adequate operation of these principles and other disk diameters and/or change in number of disks may improve the invention's performance for differing applications.

Internal combustion engine's air intake requirements vary during engine operations due to fluctuating demand. This fact requires that the turbocharger be able to vary the pressure and volume of output relative to engine requirements. Current technology utilizes bypass mechanisms that vents engine exhaust gases around the turbine in order to diminish the velocity of the system which reduces the output of the compressor. Since the laminar air flow characteristics of the claimed invention do not create significant increased temperature of the air, the output control of the system is accomplished by restricting inlet air to the blower rather than diminishing the system's rotational velocity. This characteristic allows for the system to run at maximum velocity at all times and produces an immediate response to air demand for combustion during the varying operating conditions of the engine.

In order to optimize performance at low engine speeds, the turbine volute may utilize a variable nozzle. By decreasing the cross sectional area of the turbine nozzle the velocity of exhaust gas entering the turbine increases. This will reduce turbocharger lag, an undesirable characteristic of all turbochargers.

To achieve the foregoing and other objectives, and in accordance with the purposes of the present invention, a bladeless turbocharger is provided. The bladeless turbocharger includes a bearing assembly with a drive shaft having a first end portion and a second end portion passing through and rotationally engaged with the bearing assembly. A bladeless turbine is mounted to the first end portion of the drive shaft, and a bladeless blower is mounted to the second end portion of the drive shaft.

The bladeless turbine comprises a turbine volute, an inner turbine wall adjacent the turbine volute, and an outer turbine wall adjacent the turbine volute and opposite the inner turbine wall. A plurality of parallel flat turbine disks are contained in the turbine volute spaced at a critical distance of from about 0.006" to about 0.012" apart having open circular centers with a plurality of spoke like projections fixedly mounting the turbine disk centers to the first end portion of the drive shaft, the critical distance permitting only boundary layer drag effect activity of exhaust gas from the internal combustion engine within the critical distance. At least one turbine inlet is provided within the wall of the turbine volute in tangential relation to the periphery of the turbine disks capable of allowing the exhaust gas to enter the turbine tangentially to the periphery of the turbine disks, the exhaust gas pushed through the turbine inlet by the exhaust stroke of the internal combustion engine into the critical distances between the turbine disks rotating the turbine disks and the drive shaft by energy transferred from the exhaust gas through boundary layer drag effect of the exhaust gas against the turbine disks. A turbine outlet is provided within the outer turbine wall axially adjacent the open circular centers of the turbine disks capable of allowing the exhaust gas to exit the bladeless turbine through the open circular center of the turbine disks.

The bladeless blower driven by the drive shaft, comprises a blower volute, an inner blower wall adjacent the blower volute, an outer blower wall adjacent the blower volute and opposite the inner blower wall. A plurality of parallel flat blower disks contained in the blower volute spaced at the critical distance apart having open circular centers with a plurality of spoke like projections fixedly mounting the blower disk centers to the second end portion of the rotating drive shaft, the critical distance permitting only boundary layer drag effect activity of air within the critical distance. A blower inlet is provided within the outer blower wall axially adjacent the open circular centers of the blower disks, the blower inlet capable of allowing the air to enter the blower through the open circular centers of the blower disks into the critical distances between the blower disks, the air being drawn in through the blower inlet due to the pressure difference created by the blower disks rotating within the blower volute whereby the rotational energy of the blower disks is transferred to the air by boundary layer drag effect activity of the air against the rotating blower disks thereby increasing the mass per unit volume of air. A blower outlet is provided that is configured within the wall of the blower volute determined by the Fabonacci formula and in tangential relation to the periphery of the blower disks, the blower outlet capable of allowing the air of increased mass per unit volume to exit the bladeless blower tangentially to the periphery of the blower disks into a engine intake of the internal combustion engine.

DETAILED DESCRIPTION OF THE PREFERRED EMBODIMENT

Figure 1:
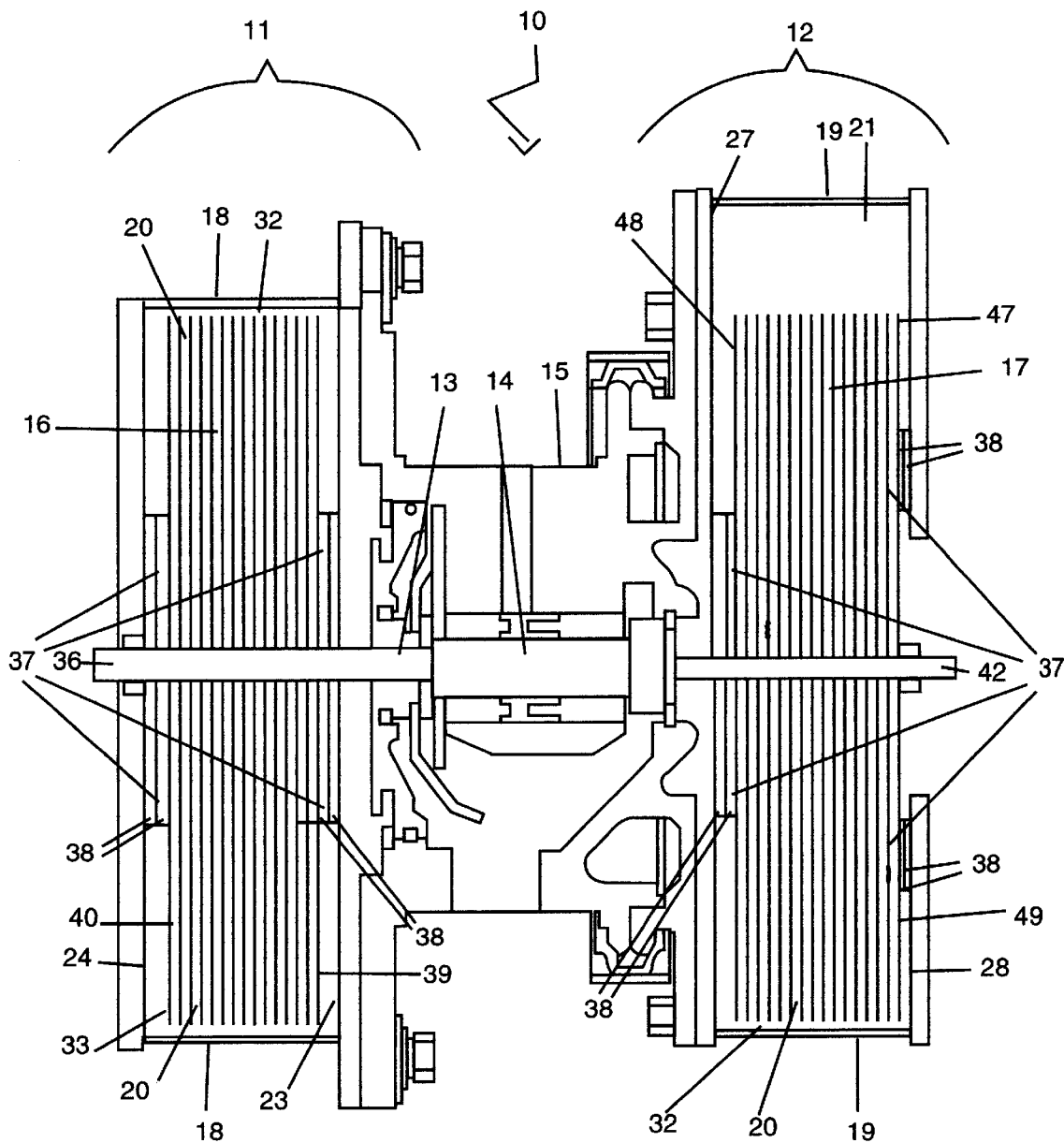
FIG. 1 is a sectional view of the bladeless turbocharger.
Figure 2:
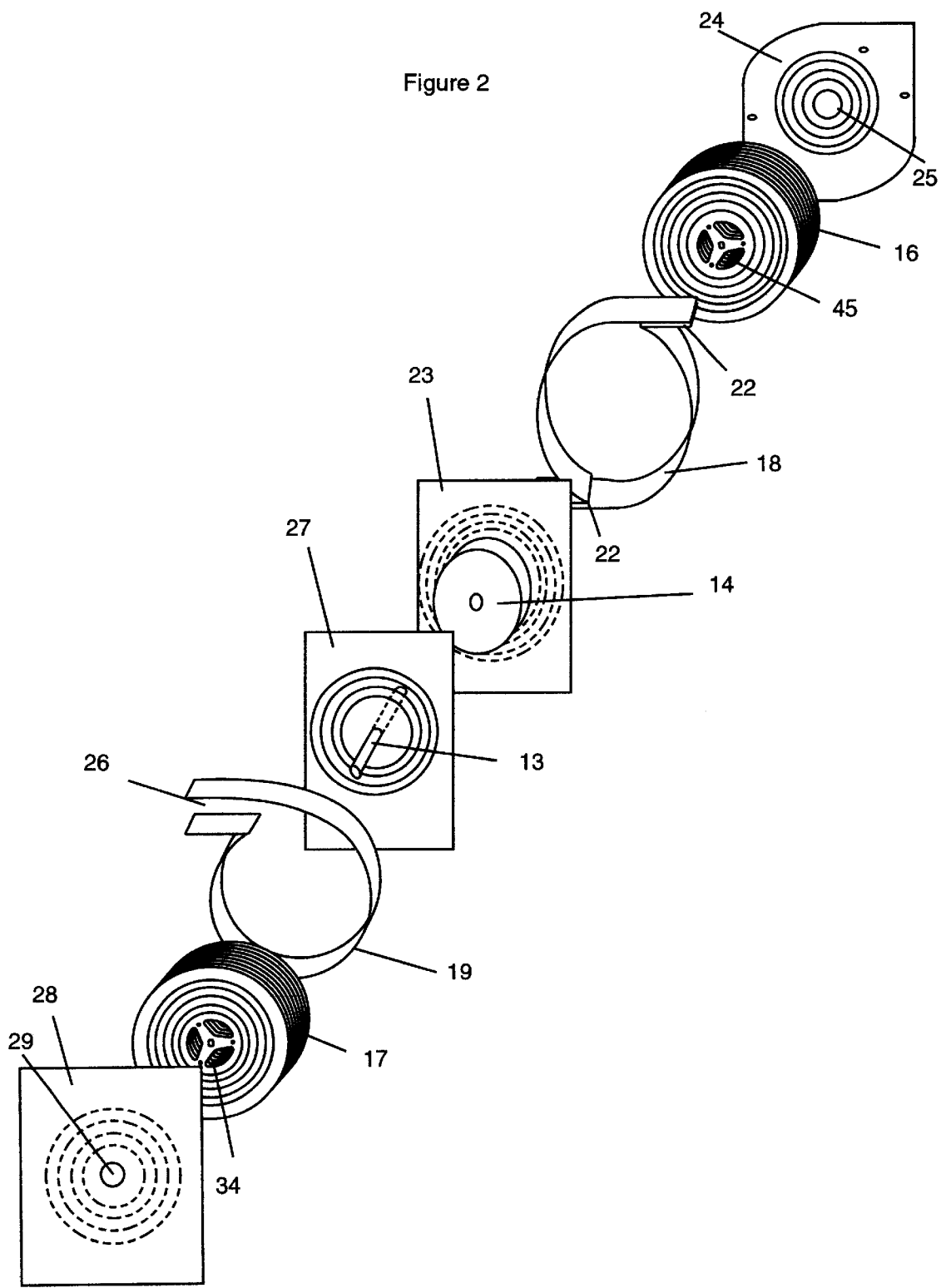
FIG. 2 is an exploded view of the bladeless turbocharger.

Referring now to the drawings, a bladeless turbocharger 10 for use with internal combustion engines is illustrated in FIG. 1 and FIG. 2. The bladeless turbocharger 10 is made up of a turbine 11 and a blower 12. The turbine 11 and the blower 12 are in communication with each other through a drive shaft 13 that rotates in a bearing assembly 14 located between the turbine 11 and blower 12 in a housing 15 that connects the turbine 1 1 and the blower 12.

FIG. 1 shows the bearing assembly 14 that is used in the preferred embodiment that is commercially available from Air research Company, but several similar types of bearing systems are contemplated to be adaptable for use with the claimed invention. It is necessary for the bearing assembly 14 to hold the drive shaft 13 in place with relatively high precision due to the close proximity of the collection of flat turbine disks 16 and collection of blower disks 17 with turbine volute 18 and the blower volute 19.

Figure 3:
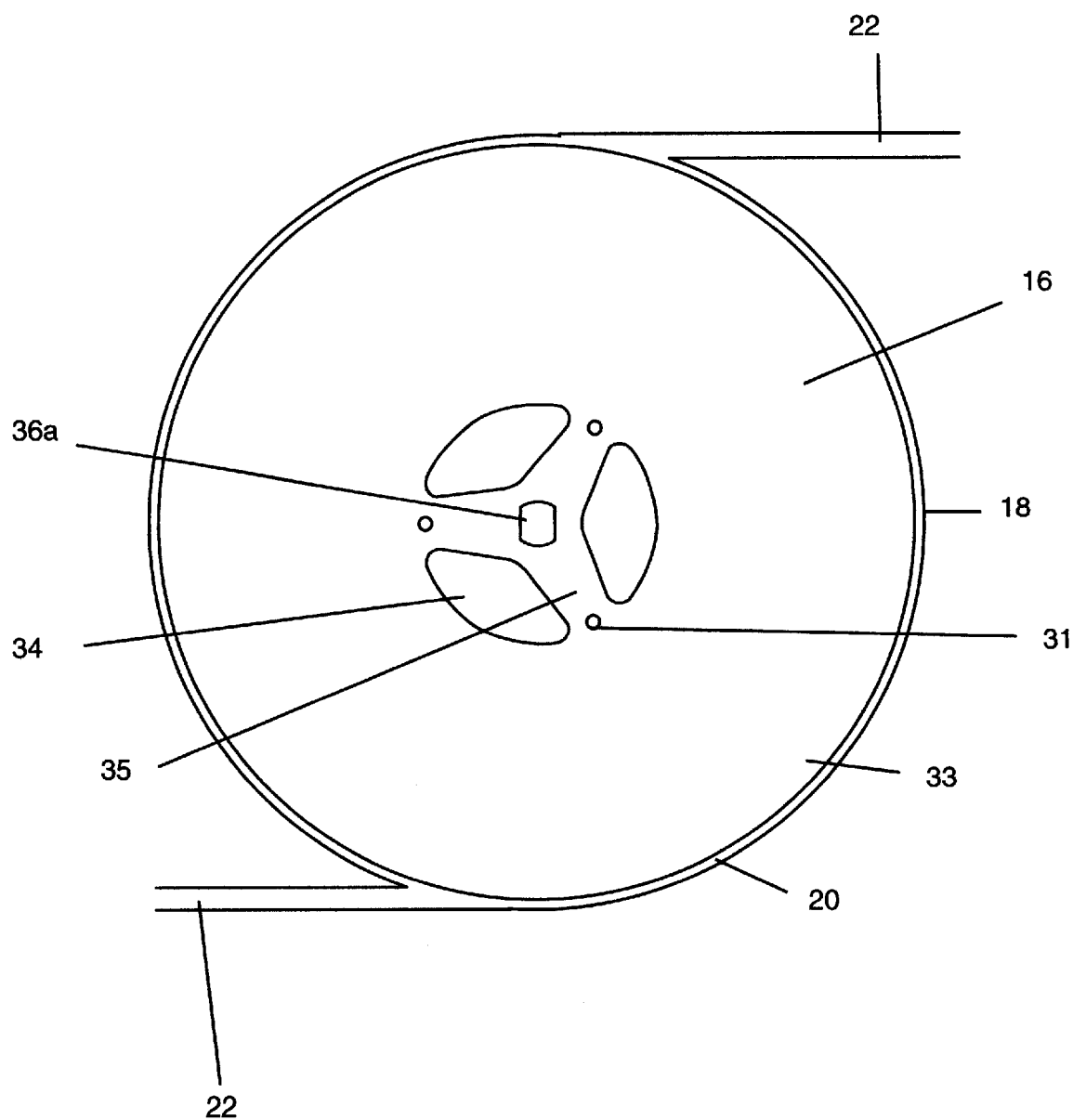
FIG. 3 is an end section of the turbine of the bladeless turbocharger.
Figure 5:
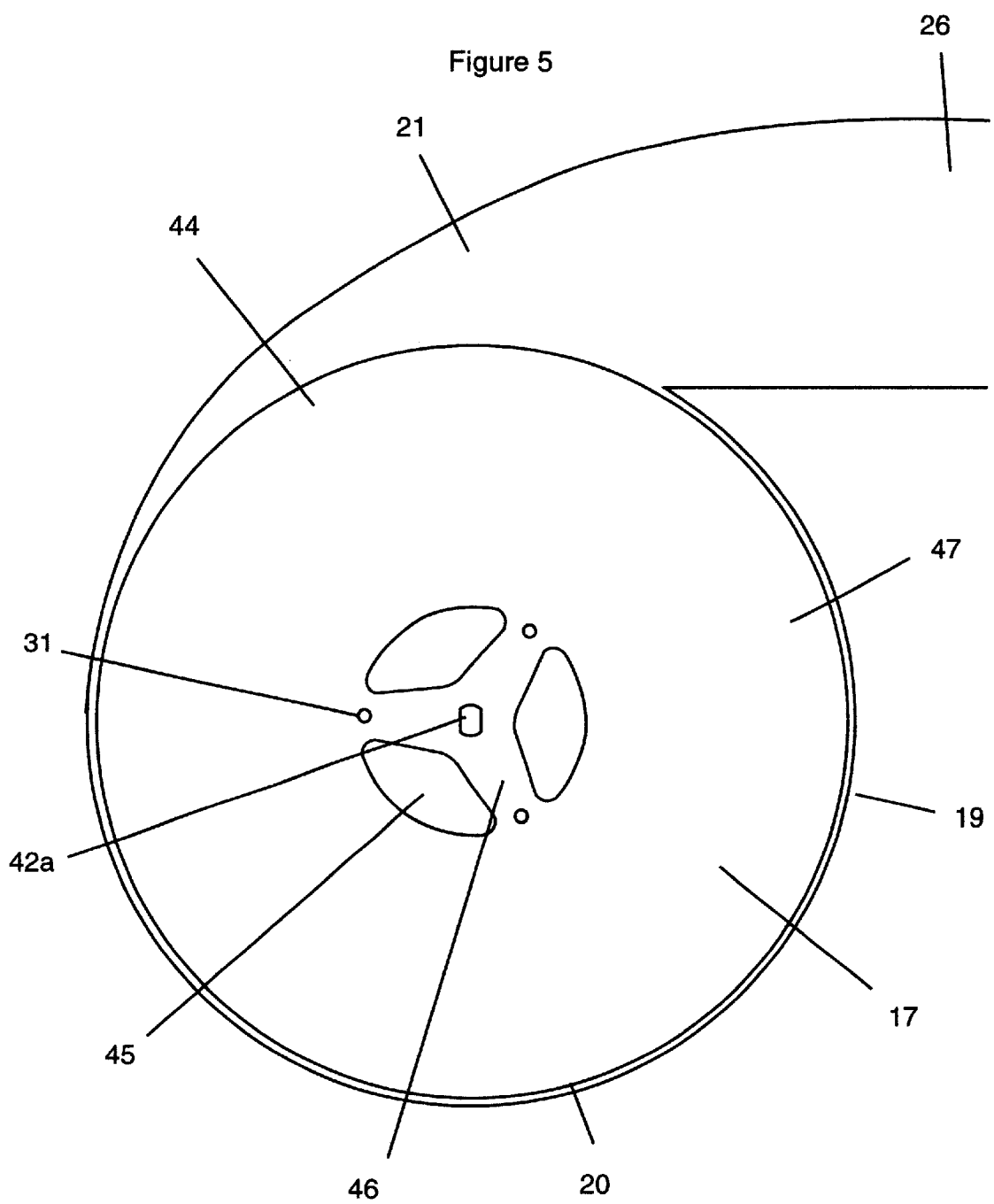
FIG. 5 is an end section of the blower of the bladeless turbocharger.

FIG. 1 and FIG. 2 show the turbine volute 18 that contains the collection of flat turbine disks 16 and a blower volute 19 that contains the collection of flat blower disks 17. The turbine volute 18 provides 0.020" to 0.030" clearance 20 between the turbine volute 18 and the collection of flat turbine disks 16. FIG. 3 shows and end view of the turbine 11. The blower volute 19 is designed to contain the collection of flat blower disks 17 with the same 0.020" to 0.030" clearance 20 between the blower volute 19 and the collection of flat blower disks 17 for approximately 75% of the perimeter of the blower disks 17. FIG. 5 shows the clearance 21 between the blower volute 19 and the collection of flat blower disks 17 for the remainder of the blower volute 19 rapidly increases in a relationship described by the Fibonacci formula.

Figure 6:
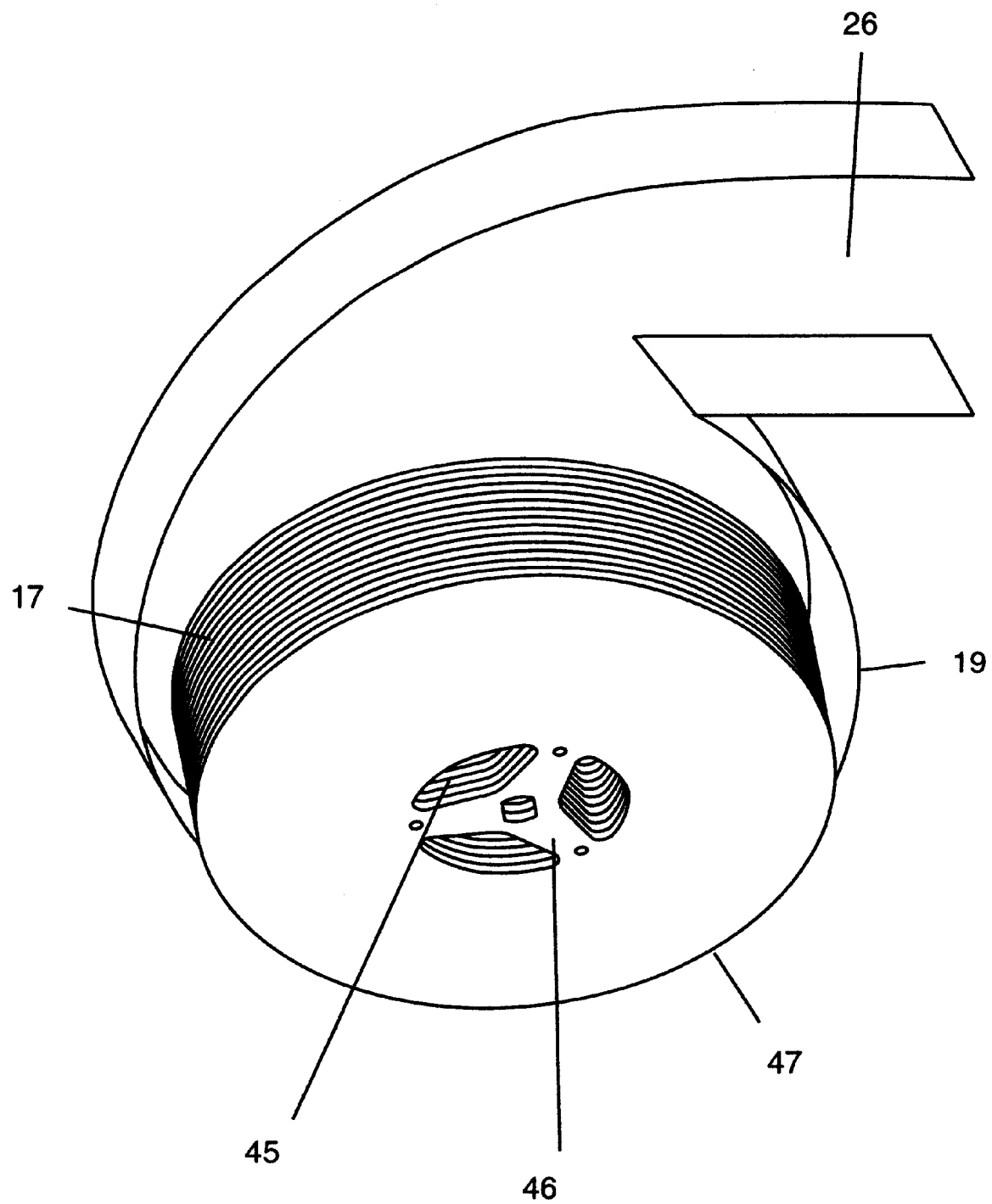
FIG. 6 is a perspective view of the blower.
Figure 7:
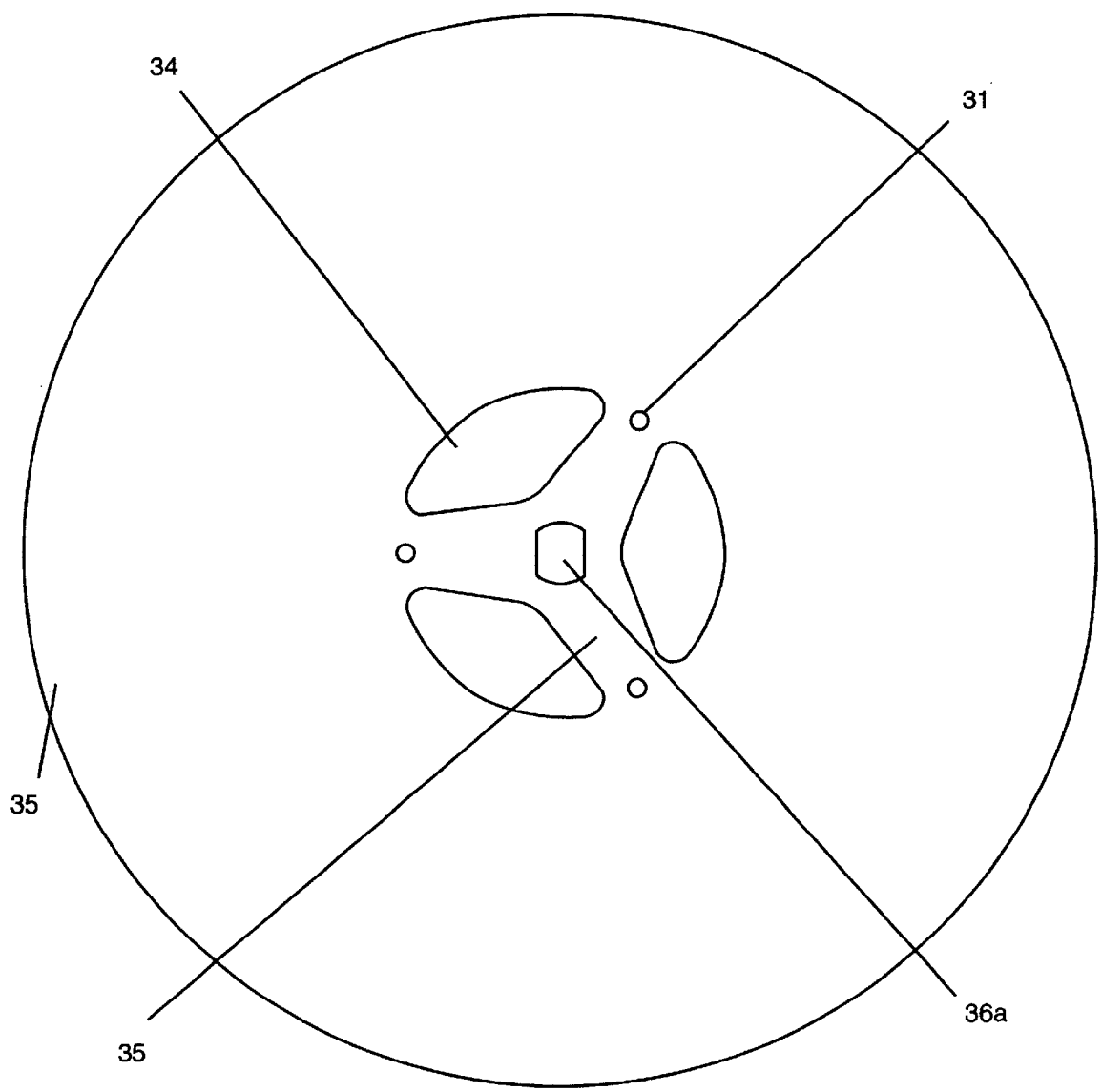
FIG. 7 is a front view of a flat turbine disk.

FIG. 1 through FIG. 4 show the turbine 11 has a turbine volute 18 with two turbine inlets 22, an inner turbine wall 23, and an outer turbine wall 24. The two turbine inlets 22 allow exhaust gas from an internal combustion engine to enter the turbine 11 through the turbine inlets 22 and exit the turbine 11 through the turbine outlet 25 at the center of the outer turbine wall 24. FIG. 1, FIG. 5 and FIG. 6 show the blower 12 has a blower volute 19 with a blower outlet 26, an inner blower wall 27, and an outer blower wall 28. The outer blower wall 28 has a blower inlet 29 that allows air to be drawn into the blower 12 and accelerated out the blower 12 through the blower outlet 26. See FIG. 2.

Figure 8:
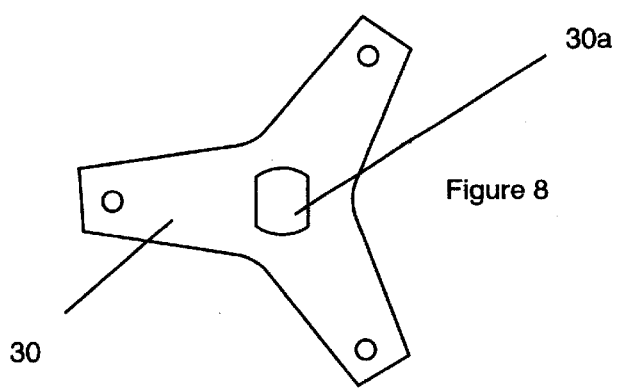
FIG. 8 is a front view of a specially sized turbine spacer.

FIG. 1 and FIG. 2 show the turbine 11 consists of a plurality of parallel flat turbine disks 16 inside the turbine volute 18 that are mounted in a collection on the drive shaft 13 spaced apart by specially sized turbine spacers 30 and secured by threaded fasteners 31. The number and size of the flat turbine disks 16, specially sized turbine spacers 30, and threaded fasteners 31 are determined by the type of internal combustion engine in which the bladeless turbocharger 10 is to be used on. See FIG. 3 for the location of the threaded fasteners 31. There are specific engine mapping processes available in the public domain that describe optimum engine requirements, such as air charge volume and pressure, at specific engine performance characteristics. The collection of flat turbine disks 16, specially sized turbine spacers 30, and threaded fasteners 31 are made of a rigid, corrosion resistant material, preferably stainless steel. See FIG. 8 for the specially sized turbine spacers 30.

Figure 4:
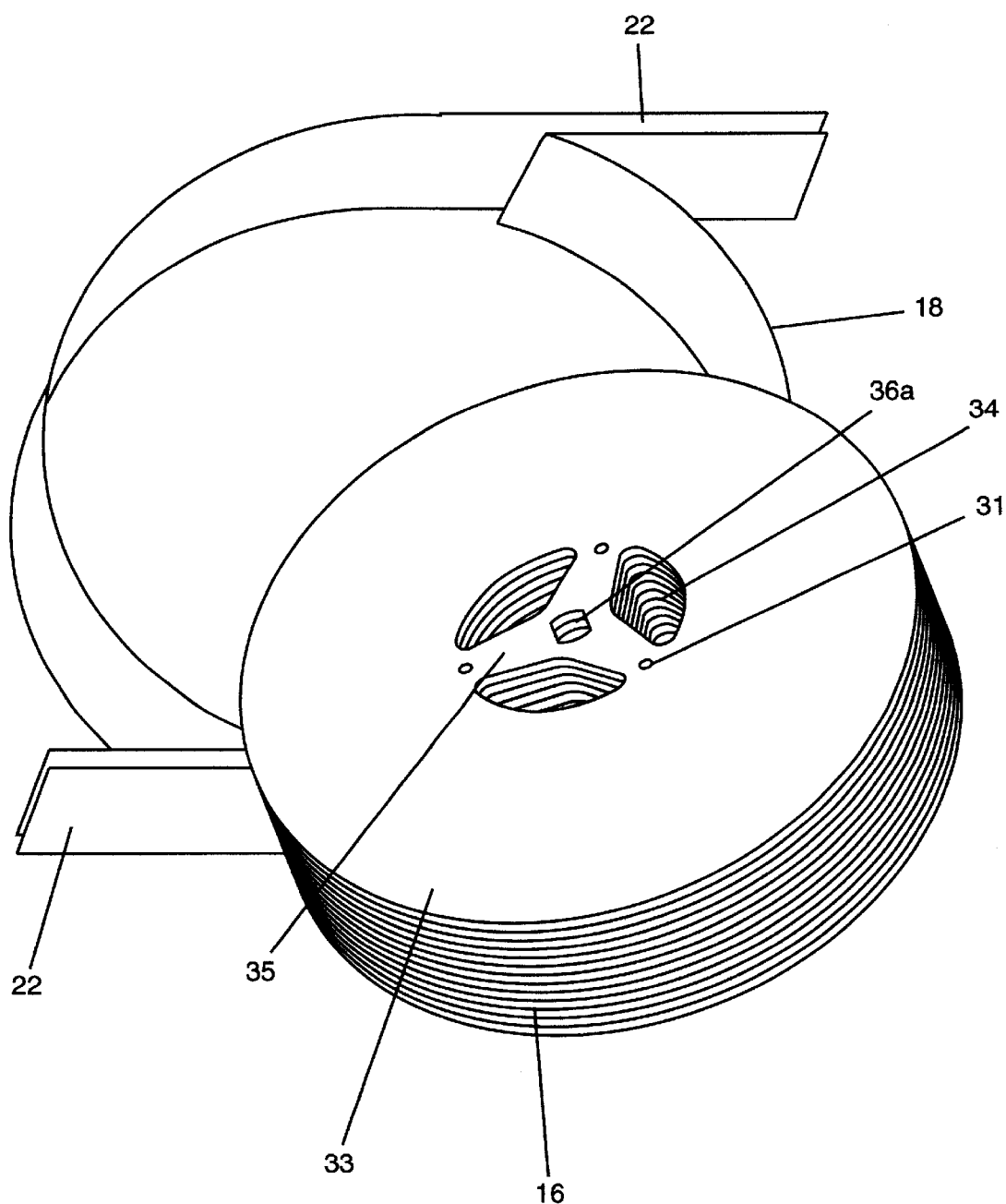
FIG. 4 is a perspective view of the turbine.
Figure 9:
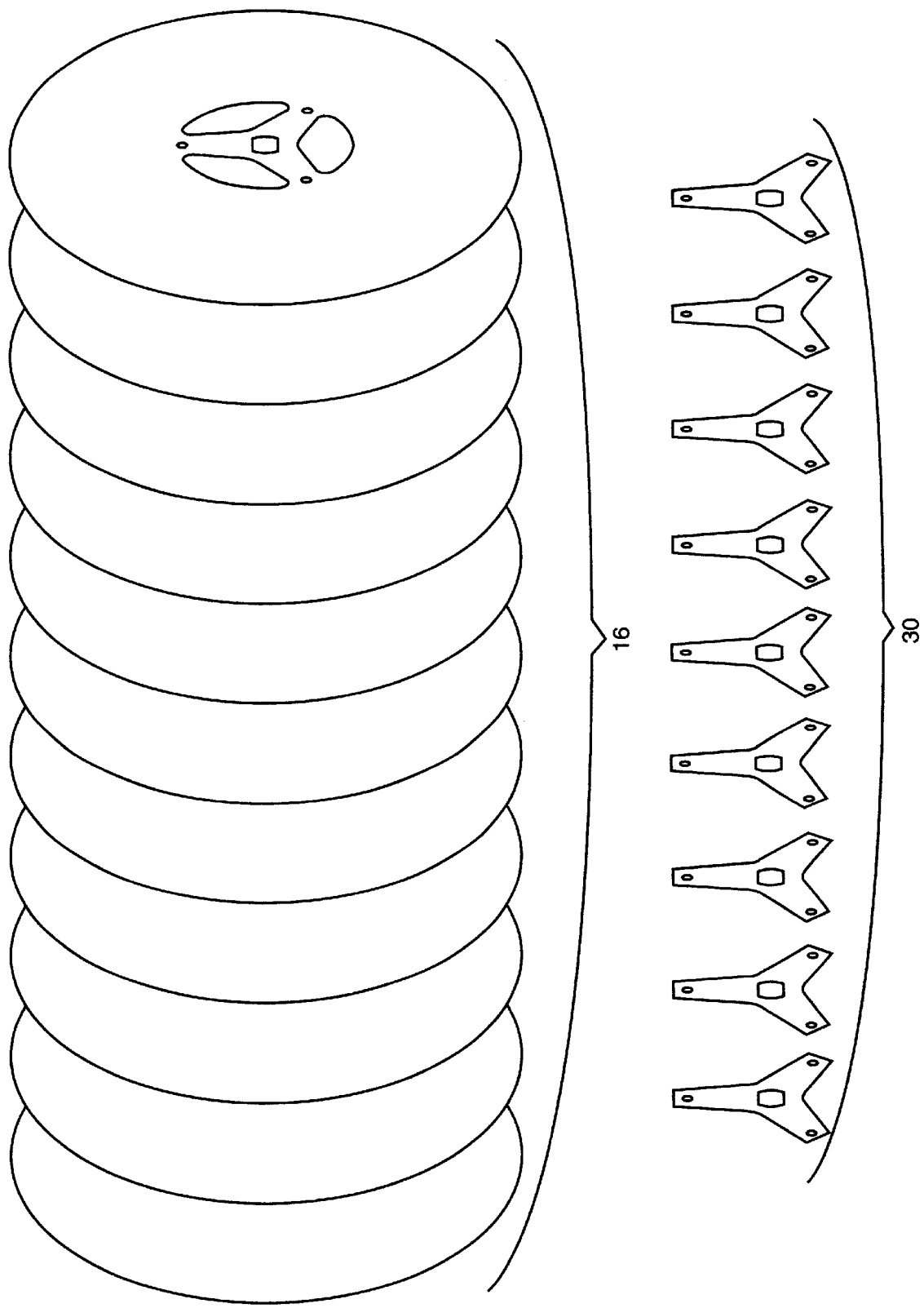
FIG. 9 is a side view showing the turbine disks and specially sized turbine spacers.

In FIG. 1, the collection of flat turbine disks 16 are spaced at a critical distance 32 of 0.006" to 0.012" apart by specially sized turbine spacers 30 and have a diameter such that there is clearance 20 between the periphery 33 of the flat turbine disks 16 and the inside of turbine volute 18, in the range of 0.020to 0.030". The clearance 20 between the flat turbine disks 16 and the inside of the turbine volute 18 is determined by the revolutions per minute that the bladeless turbocharger is configured to handle. At higher revolutions per minute, the flat turbine disks 16 tend to elongate based on the modulus of elasticity of the material in which the flat turbine disks 16 are made. FIG. 3 shows each flat turbine disk 16 has an open circular center 34 with three radially spaced spokes 35 mounting the flat turbine disks 16 to the drive shaft 13. FIG. 4 shows the three radially spaced spokes 35. The specially sized turbine spacers 30 are used to space the flat turbine disks 16 apart by a critical distance 32. See FIG. 1. This critical distance 32, in the range of 0.006" to 0.012", allows exhaust gas that enters the turbine 11 to flow between the flat turbine disks 16. Each specially sized turbine spacer 30 has an opening at the center 30a to fit around a first end portion of the drive shaft 36 and are shaped to conform to the profile of the spokes 35 at the center of the turbine disks 16. See FIG. 8. The flat turbine disks 16 spaced apart by the specially sized turbine spacers 30 are fixed together into a collection by threaded fasteners 31. FIG. 9 shows how the specially sized turbine spacers 30 match up with the turbine disks 16.

FIG. 3 and FIG. 4 show two turbine inlets 22 are positioned to direct the exhaust gas from the internal combustion engine into the turbine 11 tangentially to the periphery 33 of the flat turbine disks 16. The turbine inlets 22 are equally spaced in the turbine volute 18 so that the internal combustion engine sequentially pushes the exhaust gas from the cylinders through the turbine inlets 22 into the turbine 11, resulting in a substantially uniform flow rate of exhaust gas entering the turbine 11. In order to optimize performance of the bladeless turbocharger 10 at low engine speeds, a variable nozzle (not shown) is used in conjunction with the turbine inlets 22 to decrease the cross sectional area of the turbine inlets 22 thus increasing the velocity of the exhaust gas entering the turbine 11. The close proximity between the inside of the turbine volute 18 and the periphery 33 of the flat turbine disks 16 guides the exhaust gas into the critical distance 32 between the flat turbine disks 16. See FIG. 3. This allows the force that is imparted on the exhaust gas from the exhaust stroke of the internal combustion engine to rotate the flat turbine disks 16 mounted on the drive shaft 13 by the boundary layer drag effect of the exhaust gas against the surface of the flat turbine disks 16. The critical distance 32 between the flat turbine disks 16 promotes boundary layer effect activity only. It is well known that the boundary layer flow effect occurs due to the resistance of flow of a fluid adjacent a surface. This resistance, known as viscosity, takes place when a fluid is either pushed past a stationary object or when an object is moved through a fluid. At the point where the fluid meets the surface of the object, the fluid resists movement and tends to flow in a uniform manner, called laminar flow, along the surface of the object. The laminar flow of the exhaust gas between the flat turbine disks 16 imparts highly efficient energy transfer from the exhaust gas to the flat turbine disks 16.

As the collection of flat turbine disks 16 rotate the drive shaft 13, the laminar flow of the exhaust gas directs the flow of the exhaust gas into a spiral path towards the center of the flat turbine disks 16. The spiral path between the flat turbine disks 16 promotes a long exhaust gas residence time in which energy from the exhaust gas is transferred to the disks 16. The exhaust gas leaves the critical distance 32 between the flat turbine disks 16 through the open circular center 34 of the flat turbine disks 16 and exits the turbine 11 by way of the turbine outlet 25 located at the center of the outer turbine wall 24 which is axially adjacent to the collection of turbine disks 16. FIG. 2 shows the turbine inlets 22 in the turbine volute 18 and turbine outlet 25 on the outer turbine wall 24.

Figure 12:
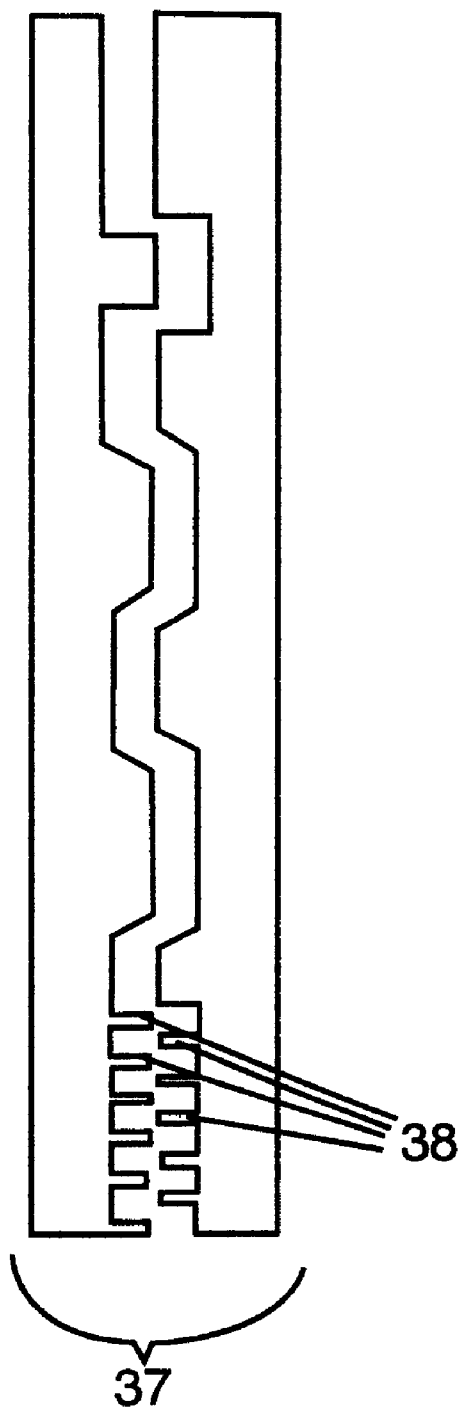
FIG. 12 is a side view of one of the labyrinth seals.

FIG. 1 shows a labyrinth seal 37 formed by interrelated concentric ridges 38 between the inner face 39 of the collection of flat turbine disks 16 and the inner turbine wall 23. FIG. 12 shows the concentric ridges 38. The labyrinth seal 37 prevents exhaust gas from escaping between the collection of flat turbine disks 16 and the inner turbine wall 23 and out the turbine outlet 25 without imparting energy on the collection of flat turbine disks 16. Similarly, the outer face 40 of the collection of flat turbine disks 16 has a labyrinth seal 37 formed by interrelated concentric ridges 38 between the outer face 40 of the collection of flat turbine disks 16 and the outer turbine wall 24. The drive shaft 13 is rotated by the energy transferred from the exhaust gas to the collection of flat turbine disks 16. FIG. 1 shows rotation of the drive shaft 13 within the bearing assembly 14 will drive the collection of flat blower disks 17 within the blower volute 19 of the bladeless turbocharger 10.

Figure 10:
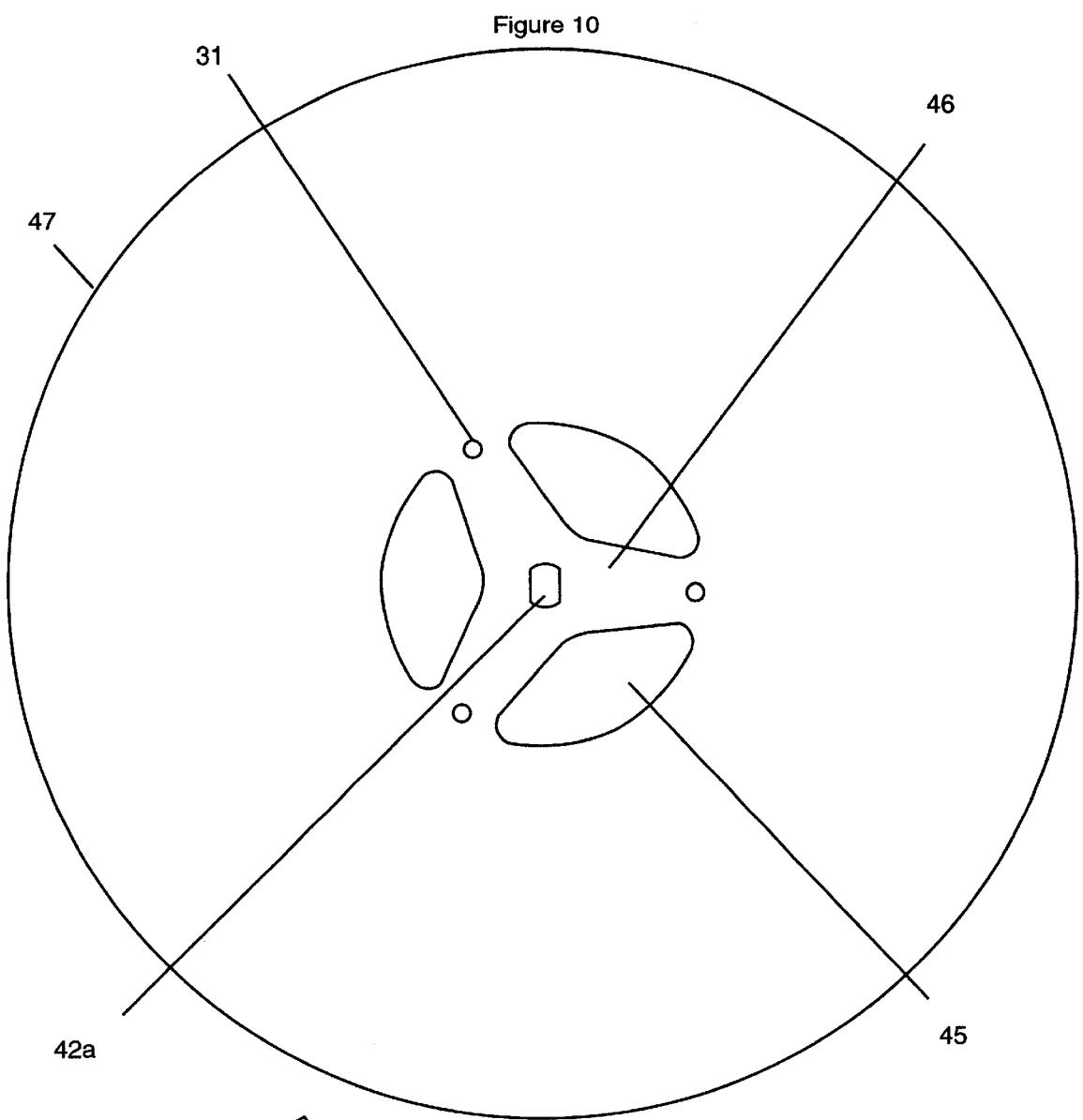
FIG. 10 is a front view of a flat blower disk.
Figure 11:
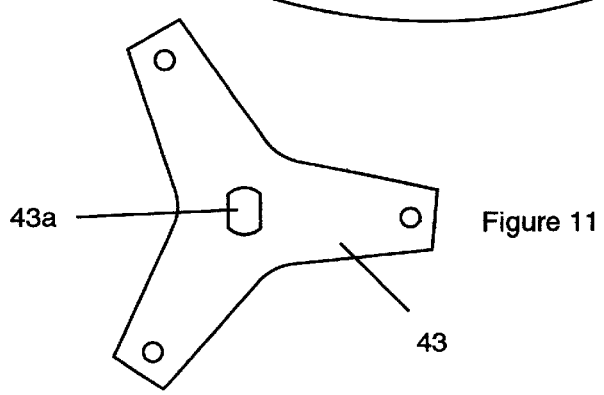
FIG. 11 is a front view of a specially sized blower spacer.

The drive shaft 13 is fixed within the bearing assembly 14 so that when the energy from the exhaust gas is transferred to the collection of flat turbine disks 16, the collection of flat turbine disks 16 rotate the drive shaft 13 within the bearing assembly 14. The collection of flat turbine disks 16 are mounted on the first end portion of the drive shaft 36 that has a larger cross sectional area than the second end portion of the drive shaft 42 in order to accommodate the torque that is imparted on the drive shaft 13 from the collection of flat turbine disks 16. FIG.3 and FIG. 4 show the hole 36a at the center of the spokes 35 of the turbine disks 16 that mount the turbine disks 16 to the first end of the drive shaft 36. The collection of flat blower disks 17 are mounted on the second end portion of the drive shaft 42. FIG. 10 and FIG. 11 show the hole 42a at the center of the spokes 46 of the blower disks 17 that mount the blower disks 17 to the second end of the drive shaft 42. The bearing assembly 14 allows the collection of flat blower disks 17 to rotate at the same rotational velocity that the exhaust gas rotates the flat turbine disks 16.

The blower 12 consists of a plurality of parallel flat blower disks 17 inside the blower volute 19 that are mounted in a collection on the second end portion of the drive shaft 42 spaced apart by specially sized blower spacers 43 and secured by threaded fasteners 31. The number and size of the flat blower disks 17, specially sized blower spacers 43, and threaded fasteners 31 are determined by the type of internal combustion engine in which the bladeless turbocharger 10 is to be used on. The collection of flat blower disks 17, specially sized blower spacers 43 are made of a rigid, lightweight material, preferably aluminum.

FIG. 5 and FIG. 6 show the collection of flat blower disks 17 are spaced at the critical distance 32 of 0.006" to 0.012" apart by specially sized blower spacers 43 with a diameter such that there is a clearance 20 between the periphery 33 of the collection of flat blower disks 17 and the inside of the blower volute 19 in the range of 0.020" to 0.030" for approximately 75% of the circumference of the collection of flat blower disks 17. The clearance 21 between the remainder of the periphery 44 of the collection of flat blower disks 17 and the blower volute 19 increases rapidly as determined by the Fabonacci formula. Each flat blower disk 17 has an open circular center 45 with three radially spaced spokes 46 mounting the flat blower disks 17 to the drive shaft 13. FIG. 10 shows the three radially spaced spokes 46. The specially sized blower spacers 43 are used to space the flat blower disks 17 apart by a critical distance 32, in the range of 0.006"to 0.012", that allows ambient air that enters the blower 12 to flow between the flat blower disks 17. Each specially sized blower spacer 43 has an opening at the center 43a to fit around a second end portion of the drive shaft 42 and are shaped to conform to the profile of the spokes 46 at the center of the flat blower disks 17. FIG. 11 shows the shape of the specially sized blower spacers 43. The flat blower disks 17, spaced apart by the specially sized blower spacers 43, are fixed together into a collection by threaded fasteners 31. The drive shaft 13 that the flat blower disks 17 are mounted on is rotated by the turbine 11 of the bladeless turbocharger 10.

FIG. 2 shows the blower inlet 29 at the center of the outer blower wall 28 that draws ambient air into the center of the blower volute 19 adjacent to the center of the rotating collection of flat blower disks 17. FIG. 6 shows each flat blower disk has an open circular center 45 with radially spaced spokes 46 mounting the flat blower disks 17 to the drive shaft 13. The open circular center 45 of the flat blower disks 17 allows air drawn into the blower 12 through the blower inlet 29 to enter the critical distance 32 between the rotating flat blower disks 17. Utilizing the principles of the boundary layer drag effect as described in the operation of the turbine 11, the critical distance 32 between the flat turbine disks 16 promotes boundary layer effect activity only. The viscosity of the air against the rotating blower disk collection accelerates the speed of the air between the rotating flat blower disks 17 by dragging the air along the surface of the blower disks 17, thus imparting the rotational energy of the blower disks 17 to the air. As the collection of rotating flat blower disks 17 accelerates the air, the air is subjected to centrifugal force from the rotating flat blower disks 17. The centrifugal force directs the laminar flowing air into a spiral path toward the periphery 47 of the rotating flat blower disks 17. Since this spiral movement of air only changes the velocity and direction of the air in small increments, it does not cause the air to become turbulent. The acceleration of the air in small increments compresses the air within the blower volute 19 while maintaining laminar flow. This compression of the air while maintaining a laminar flow pattern increase the density of the air per unit of volume delivered to the internal combustion engine. The compressed air leaves the periphery 47 of the rotating flat blower disks 17 and exits the blower volute 19 through the blower outlet 26 into the engine intake of the internal combustion engine. FIG. 5 and FIG. 6 show the blower outlet 26. When the compressed air leaves the periphery 47 of the flat blower disks 17 and exits the bladeless turbocharger 10 through the blower outlet 26, the flow of the air tends to become turbulent. However, due to the reduced turbulence imparted on the air by the blower 12, a diffuser that reduces the turbulence further is not needed.

FIG. 1 shows the flat blower disk 48 adjacent the inner blower wall 27 has a labyrinth seal 37 formed by interrelated concentric ridges 38 between the inner face of the collection of flat blower disks 17 and the inner blower wall 27. FIG. 12 show the labyrinth seal 37 detail. The labyrinth seal 37 prevents air from escaping between the collection of flat blower disks 17 and the inner blower wall 27 and out the blower outlet 26 without energy from the collection of flat blower disks 17 being imparted on the air. Similarly, the flat blower disk 49 adjacent the outer blower wall 28 has a labyrinth seal 37 formed by interrelated concentric ridges 38 between the outer face of the collection of flat blower disks 17 and the outer blower wall 28.

The compressed air delivered to the internal combustion engine by the bladeless turbocharger 10 allows an increased amount of fuel to be added to the fuel and air mixture that is burned in the combustion chambers of the internal combustion engine. This increase in fuel and air mixture delivered to the internal combustion engine increases the power output potential of the internal combustion engine.

The air intake requirements of the internal combustion engine varies during engine operation due to fluctuating demand of power provided by the internal combustion engine. This requires the bladeless turbocharger 10 to be capable of varying the pressure and volume of air input relative to engine requirements. Due to the laminar flow that the blower 12 imparts on the air leaving the bladeless turbocharger 10, the bladeless turbocharger 10 does not significantly increase the temperature of the air leaving the bladeless turbocharger 10. The slight increase of temperature allows the pressure and volume of the air leaving the bladeless turbocharger 10 to be varied by restricting air entering the blower 12 through the blower inlet 29 by a standard throttle body (not shown). This characteristic allows for the bladeless turbocharger 10 to run at maximum velocity at all times thus reducing the response time of the bladeless turbocharger 10 during variable requirements for air to be injected into the engine intake of the internal combustion engine.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. In combination, an internal combustion engine and a bladeless turbocharger, the combination comprising:
   an internal combustion engine;
   a bladeless turbocharger in communication with the internal combustion
   engine, the bladeless turbocharger comprising:
   a bearing assembly;
   a drive shaft having a first end portion and a second end portion, the drive shaft passing through and rotationally engaged with the bearing assembly;
   a bladeless turbine, the bladeless turbine comprising:
   a turbine volute;
   an inner turbine wall adjacent the turbine volute;
   an outer turbine wall adjacent the turbine volute and opposite the inner turbine wall;
   a plurality of parallel flat turbine disks contained in the turbine volute spaced at a critical distance of from about 0.006" to about 0.012" apart having open circular centers with a plurality of spoke like projections fixedly mounting the turbine disk centers to the first end portion of the drive shaft, the critical distance permitting only boundary layer drag effect activity of exhaust gas from the internal combustion engine within the critical distance;
   at least one turbine inlet within the wall of the turbine volute in tangential relation to the periphery of the turbine disks capable of allowing the exhaust gas to enter the turbine tangentially to the periphery of the turbine disks, the exhaust gas pushed through the turbine inlet by the exhaust stroke of the internal combustion engine into the critical distances between the turbine disks rotating the turbine disks and the drive shaft by energy transferred from the exhaust gas through boundary layer drag effect of the exhaust gas against the turbine disks;
   a turbine outlet within the outer turbine wall axially adjacent the open circular centers of the turbine disks capable of allowing the exhaust gas to exit the bladeless turbine through the open circular center of the turbine disks;
   a bladeless blower driven by the drive shaft, the blower comprising:
   a blower volute;
   an inner blower wall adjacent the blower volute;
   an outer blower wall adjacent the blower volute and opposite the inner blower wall;

a plurality of parallel flat blower disks contained in the blower volute spaced at the critical distance apart having open circular centers with a plurality of spoke like projections fixedly mounting the blower disk centers to the second end portion of the rotating drive shaft, the critical distance permitting only boundary layer drag effect activity of air within the critical distance;

a blower inlet within the outer blower wall axially adjacent the open circular centers of the blower disks, the blower inlet capable of allowing the air to enter the blower through the open circular centers of the blower disks into the critical distances between the blower disks, the air being drawn in through the blower inlet due to the pressure difference created by the blower disks rotating within the blower volute whereby the rotational energy of the blower disks is transferred to the air by boundary layer drag effect activity of the air against the rotating blower disks thereby increasing the mass per unit volume of air; and a blower outlet configured within the wall of the blower volute determined by the Fibonacci formula and in tangential relation to the periphery of the blower disks, the blower outlet capable of allowing the air of increased mass per unit volume to exit the bladeless blower tangentially to the periphery of the blower disks into a engine intake of the internal combustion engine.

2. The combination of claim 1 further comprising:

a first labyrinth seal of concentric interrelated ridges between the turbine disks and the inner turbine wall;

a second labyrinth seal of concentric interrelated ridges between the turbine disks and the outer turbine wall, the first and second labyrinth seals preventing the exhaust gas from exiting the turbine through the turbine outlet before transferring energy to the turbine disks.

3. The combination of claim 2 further comprising:

a third labyrinth seal of concentric interrelated ridges between the blower disks and the inner blower wall;

a fourth labyrinth seal of concentric interrelated ridges between the blower disks and the outer blower wall, the third and fourth labyrinth seals preventing the air from exiting the blower through the blower outlet before the mass per unit volume of the air in increased.

4. The combination of claim 3 further comprising at least one variable nozzle contained in the turbine inlet, the variable nozzle being capable of varying the cross sectional area of the turbine inlet so that the velocity of the exhaust gas entering the turbine may be increased or decreased.

5. The combination of claim 4 further comprising at least one variable nozzle contained in the blower inlet, the variable nozzle being capable of varying the cross sectional area of the blower inlet so that the velocity of the air entering the blower may be increased or decreased.

6. The combination of claim 5 wherein:

the bladeless turbine has two turbine inlets;

the turbine disks have three spoke like projections fixedly mounting the turbine disk centers to the first end portion of the drive shaft;

the turbine disks and the drive shaft are made of stainless steel.

7. The combination of claim 5 wherein:

the blower disks have three spoke like projections fixedly mounting the blower disk centers to the second end portion of the drive shaft;

the blower disks are made of aluminum.

8. A turbocharger for use with an internal combustion engine, the turbocharger comprising:

a bearing assembly;

a drive shaft having a first end portion and a second end portion, the drive shaft passing through and rotationally engaged with the bearing assembly;

a turbine fixed to the first end portion of the drive shaft, the turbine driving the drive shaft;

a bladeless blower driven by the turbine, the blower comprising:

a blower volute;

an inner blower wall adjacent the blower volute;

an outer blower wall adjacent the blower volute and opposite the inner blower wall;

a plurality of parallel flat blower disks contained in the blower volute spaced at a critical distance apart having open circular centers with a plurality of spoke like projections fixedly mounting the blower disk centers to the second end portion of the rotating drive shaft, the critical distance permitting only boundary layer drag effect activity of air within the critical distance;

a blower inlet within the outer blower wall axially adjacent the open circular centers of the blower disks, the blower inlet capable of allowing the air to enter the blower through the open circular centers of the blower disks into the critical distances between the blower disks, the air being drawn in through the blower inlet due to the pressure difference created by the blower disks rotating within the blower volute whereby the rotational energy of the blower disks is transferred to the air by boundary layer drag effect activity of the air against the rotating blower disks increasing the mass per unit volume of air; and a blower outlet configured within the wall of the blower volute determined by the Fibonacci formula and in tangential relation to the periphery of the blower disks, the blower outlet capable of allowing the air of increased mass per unit volume to exit the bladeless blower tangentially to the periphery of the blower disks into a engine intake of the internal combustion engine.

9. The turbocharger of claim 8 further comprising:

a first labyrinth seal of concentric interrelated ridges between the blower disks and the inner blower wall;

a second labyrinth seal of concentric interrelated ridges between the blower disks and the outer blower wall, the first and second labyrinth seals preventing the air from exiting the blower through the blower outlet before the mass per unit volume of the air in increased.

10. The turbocharger of claim 9 further comprising at least one variable nozzle contained in the blower inlet, the variable nozzle being capable of varying the cross sectional area of the blower inlet so that the volume of the air entering the blower may be increased or decreased.

11. The combination of claim 10 wherein:

the blower disks have three spoke like projections fixedly mounting the blower disk centers to the second end portion of the drive shaft;

the blower disks are made of aluminum.

12. A turbocharger for use with an internal combustion engine, the turbocharger comprising:

a bearing assembly;

a drive shaft having a first end portion and a second end portion, the drive shaft passing through and rotationally engaged with the bearing assembly;

a bladeless turbine, the bladeless turbine comprising:

a turbine volute;

an inner turbine wall adjacent the turbine volute;

an outer turbine wall adjacent the turbine volute and opposite the inner turbine wall;

a plurality of parallel flat turbine disks contained in the turbine volute spaced at a critical distance of from about 0.006" to about 0.012" apart having open circular centers with a plurality of spoke like projections fixedly mounting the turbine disk centers to the first end portion of the drive shaft, the critical distance permitting only boundary layer drag effect activity of a fluid within the critical distance;

at least one turbine inlet within the wall of the turbine volute in tangential relation to the periphery of the turbine disks capable of allowing exhaust gas from the internal combustion engine to enter the turbine tangentially to the periphery of the turbine disks, the exhaust gas pushed through the turbine inlet by the exhaust stroke of the internal combustion engine into the critical distances between the turbine disks rotating the turbine disks and the drive shaft by energy transferred from the exhaust gas through boundary layer drag effect of the exhaust gas against the turbine disks;

a turbine outlet within the outer turbine wall axially adjacent the open circular centers of the turbine disks capable of allowing the exhaust gas to exit the bladeless turbine through the open circular center of the turbine disks; and a blower driven by the bladeless turbine fixed to the second end portion of the drive shaft, the blower increasing the mass per unit volume of air delivered to an internal combustion engine.

13. The turbocharger of claim 12 further comprising:

a first labyrinth seal of concentric interrelated ridges between the turbine disks and the inner turbine wall;

a second labyrinth seal of concentric interrelated ridges between the turbine disks and the outer turbine wall, the first and second labyrinth seals preventing the exhaust gas from exiting the turbine through the turbine outlet before transferring energy to the turbine disks.

14. The turbocharger of claim 13 further comprising at least one variable nozzle contained in the turbine inlet, the variable nozzle being capable of varying the cross sectional area of the turbine inlet so that the velocity of the exhaust gas entering the turbine may be increased or decreased.

15. The combination of claim 14 wherein:

the bladeless turbine has two turbine inlets;

the turbine disks have three spoke like projections fixedly mounting the turbine disk centers to the first end portion of the drive shaft; the turbine disks and the drive shaft are made of stainless steel.

* * * * *